US012629755B2

(12) United States Patent
Pourcho et al.

(10) Patent No.: US 12,629,755 B2
(45) Date of Patent: May 19, 2026

(54) ADDITIVE MANUFACTURING PART MARKING SYSTEM AND PROCESS

(71) Applicant: General Electric Company, Schenectady, NY (US)

(72) Inventors: John Bryan Pourcho, Simpsonville, SC (US); John Joseph Madelone, Jr., South Glens Falls, NY (US); Justin John Gambone, Schenectady, NY (US); James Joseph Murray, Mauldin, SC (US); Robert William Davidoff, Carnegie, PA (US); Evan John Dozier, Greenville, SC (US); Maxwell Evan Miller, Simpsonville, SC (US); Chad Joseph Dulkiewicz, Simpsonville, SC (US)

( * ) Notice: Subject to any disclaimer, the term of this patent is extended or adjusted under 35 U.S.C. 154(b) by 433 days.

(21) Appl. No.: 18/323,494

(22) Filed: May 25, 2023

(65) Prior Publication Data

US 2024/0390982 A1 Nov. 28, 2024

(51) Int. Cl.
| | |
|---|---|
| *B33Y 50/00* | (2015.01) |
| *B22F 10/80* | (2021.01) |
| *B33Y 10/00* | (2015.01) |
| *G06T 9/00* | (2006.01) |

(52) U.S. Cl.
CPC .............. *B22F 10/80* (2021.01); *B33Y 50/00* (2014.12); *G06T 9/00* (2013.01); *B33Y 10/00* (2014.12)

(58) Field of Classification Search
CPC .......... B22F 10/80; B22F 10/39; B22F 10/28; B33Y 50/00; B33Y 10/00; G06T 9/00
See application file for complete search history.

(56) References Cited

U.S. PATENT DOCUMENTS

| | | | |
|---|---|---|---|
| 11,453,170 | B2 | 9/2022 | Carbone et al. |
| 2016/0061551 | A1* | 3/2016 | Petersen ................. F41A 21/30 |
| | | | 89/14.4 |
| 2016/0067927 | A1* | 3/2016 | Voris ..................... B29C 64/386 |
| | | | 700/98 |
| 2017/0072639 | A1 | 3/2017 | Levine et al. |
| 2021/0256580 | A1 | 8/2021 | Norman |
| 2022/0308562 | A1 | 9/2022 | Norman |

FOREIGN PATENT DOCUMENTS

| | | | | |
|---|---|---|---|---|
| DE | 102020129534 | A1 * | 5/2022 | ............. G06F 30/10 |
| FR | 3127152 | A1 | 3/2023 | |

OTHER PUBLICATIONS

Extended European Search Report dated Oct. 23, 2024 for Application No. 24174553.8; pp. 9.

* cited by examiner

*Primary Examiner* — Yuhui R Pan
(74) *Attorney, Agent, or Firm* — James Pemrick; Charlotte Wilson; Hoffman Warnick LLC

(57) ABSTRACT

A method for additive manufacturing an object is disclosed. The method includes converting an encoded file for a set of components to a text-based component toolpath file; creating and encoding a set of serialization (SN) files for characters in a part marking geometry; and converting encoded SN files to a set of text-based SN toolpath files. The method then generates a combined print file from the component toolpath file and the SN toolpath files to include both component and SN scan paths, wherein generating includes combining location and part marking details from a part SN location script with SN geometries from the SN toolpath files to create a modified SN toolpath file for a part marking.

18 Claims, 6 Drawing Sheets

ADDITIVE MANUFACTURING PART MARKING SYSTEM AND PROCESS

BACKGROUND OF THE INVENTION

The disclosure relates generally to additive manufacturing, and more particularly, to methods and systems for marking components of a build with serialization data during an additive manufacturing process.

Additive manufacturing (AM) includes a wide variety of processes for producing an object through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the object.

Additive manufacturing techniques typically include taking a three-dimensional computer aided design (CAD) file of the object to be formed, electronically slicing the object into layers, and creating a file with a two-dimensional image of each layer. The file may then be loaded into a preparation software system that interprets the file such that the object can be built by different types of additive manufacturing systems. In three-dimensional (3D) printing, rapid prototyping (RP), and direct digital manufacturing (DDM) forms of additive manufacturing, material layers are selectively dispensed to create the object.

In metal powder additive manufacturing techniques, such as selective laser melting (SLM) and direct metal laser melting (DMLM), metal powder layers are sequentially melted together to form the object. More specifically, fine metal powder layers are sequentially melted after being uniformly distributed using an applicator on a metal powder bed. The metal powder bed can be moved in a vertical axis. The process takes place in a processing chamber having a precisely controlled atmosphere of inert gas, e.g., argon or nitrogen. Once each layer is created, each two-dimensional slice of the object geometry can be fused by selectively melting the metal powder. The melting may be performed by, for example, a high-powered melting beam, such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed is lowered for each subsequent two-dimensional layer, and the process repeats until the object is completely formed.

In certain AM build operations, it may be necessary to mark components with unique markings (e.g., serial numbers). In some cases, an entire batch of duplicate parts are manufactured together on a single build plate during a build operation, and each component may require its own unique marking.

BRIEF DESCRIPTION OF THE INVENTION

A first aspect of the disclosure provides a method for marking parts in an additive manufacturing (AM) process. The process includes: converting an encoded component file for a set of components to a text-based component toolpath file; creating and encoding a set of serialization (SN) files for characters in a part marking geometry; converting encoded SN files to a set of text-based SN toolpath files; and generating a combined print input file from the component toolpath file and the SN toolpath files to include both component and SN scan paths, wherein generating includes combining location and part marking details from a part SN location script with SN geometries from the SN toolpath files to create modified SN toolpath files for part markings.

Another aspect of the disclosure includes any of the preceding aspects, and the encoded component file and encoded set of SN files are encoded in a stereolithography (STL) file format.

Another aspect of the disclosure includes any of the preceding aspects, and the text-based component toolpath file and the text-based SN toolpath files include common layer interface (CLI) files.

Another aspect of the disclosure includes any of the preceding aspects, and the part marking geometry includes a predefined sequence of character positions, and wherein each character position includes a set of character values that can be printed at a given character position.

Another aspect of the disclosure includes any of the preceding aspects, and the part SN location script further defines how many components are on a build plate and a file server location of the component toolpath file and the SN toolpath files.

Another aspect of the disclosure includes any of the preceding aspects, and the combined print input file is generated in response to inputs into a user interface, wherein the inputs include a print machine identifier, a batch number and a build type.

Another aspect of the disclosure includes any of the preceding aspects, and the user interface includes a graphical user interface (GUI) with selectable user inputs.

Another aspect of the disclosure includes any of the preceding aspects, and the component scan path is undisturbed by the SN scan path in the combined print input file.

Another aspect of the disclosure includes any of the preceding aspects, and the set of SN files are created with a computer aided design (CAD) SN tool and wherein the encoded SN files are named with labels indicating a character value and a character position of an associated serialized character.

Another aspect of the disclosure includes any of the preceding aspects, and inputting the combined print input file into an additive manufacturing printer and printing components with part markings using selective laser melting (SLM).

A further aspect of the disclosure provides a computing system, having a memory and a processor coupled to the memory and configured to generate part markings in an additive manufacturing (AM) process. The process includes: receiving inputs that select an AM build for a batch of components. In response to a selected AM build: determining a combined toolpath folder associated with the AM build, wherein the combined toolpath folder includes serialization (SN) toolpath files representing a part marking geometry and a component toolpath file representing component geometries; and generating combined toolpath files that include scan path data for both the batch of components and part markings, wherein scan path data for the part markings is determined according to a part SN location script that locates character geometries and selects character values for each component.

Another aspect of the disclosure includes any of the preceding aspects and includes converting the combined toolpath file to a combined print input file and implementing an AM build.

Another aspect of the disclosure includes any of the preceding aspects, and the SN toolpath files and the component toolpath file are stored in a text-based format.

Another aspect of the disclosure includes any of the preceding aspects, and the text-based format comprises common layer interface (CLI) files.

Another aspect of the disclosure includes any of the preceding aspects, and the part marking geometries include a predefined sequence of character positions, and wherein each character position includes a set of character values that can be printed at a given character position.

Another aspect of the disclosure includes any of the preceding aspects, and the part SN location script further defines how many serialized components are on a build plate and a file server location of the component toolpath file and the SN toolpath files.

Another aspect of the disclosure includes any of the preceding aspects, and the combined print input file is generated in response to inputs into a user interface from an operator, wherein the inputs include a print machine identifier, a batch number and a build type.

Another aspect of the disclosure includes any of the preceding aspects, and the user interface includes a graphical user interface (GUI) with selectable user inputs. Another aspect of the disclosure includes any of the preceding aspects, and the scan path data for the batch of components is undisturbed by the scan path data for the part markings in the combined print input file.

Another aspect of the disclosure includes any of the preceding aspects, and the part marking geometry is created with a computer aided design (CAD) SN tool.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure, it will become necessary to select certain terminology when referring to and describing relevant machine components within an additive manufacturing system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single component may include and be referenced in another context as consisting of multiple components. Alternatively, what may be described herein as including multiple components may be referred to elsewhere as a single component.

As indicated above, the disclosure provides methods and systems for marking parts in a three-dimensional (3D) printing system such as a metal powder additive manufacturing (AM) system. Various challenges exist when marking parts with unique serial numbers using AM. In particular, every time a build plate (e.g., a CAD drawing or other representation) containing one or more parts is updated to add new part markings, the resulting slice files for the parts necessarily have different scan paths (i.e., new laser triangulations are introduced). This introduces a risk of altering the base geometry of the part(s) and prohibits an exact one-to-one consistency of geometries among the same parts. The present disclosure eliminates such quality loss and enables consistency by always producing the part geometry with the same scan path, irrespective of the markings. The process allows for inputting new marking geometries onto a build plate without altering the component scan path file, which creates flexibility for updates. The process can employ an operator interface that can automatically generate print input ("build") files that overlay part marking geometries onto part geometries, which increases efficiency and avoids altering the base component geometry of the actual parts.

Additive Manufacturing Overview

Figure 1:
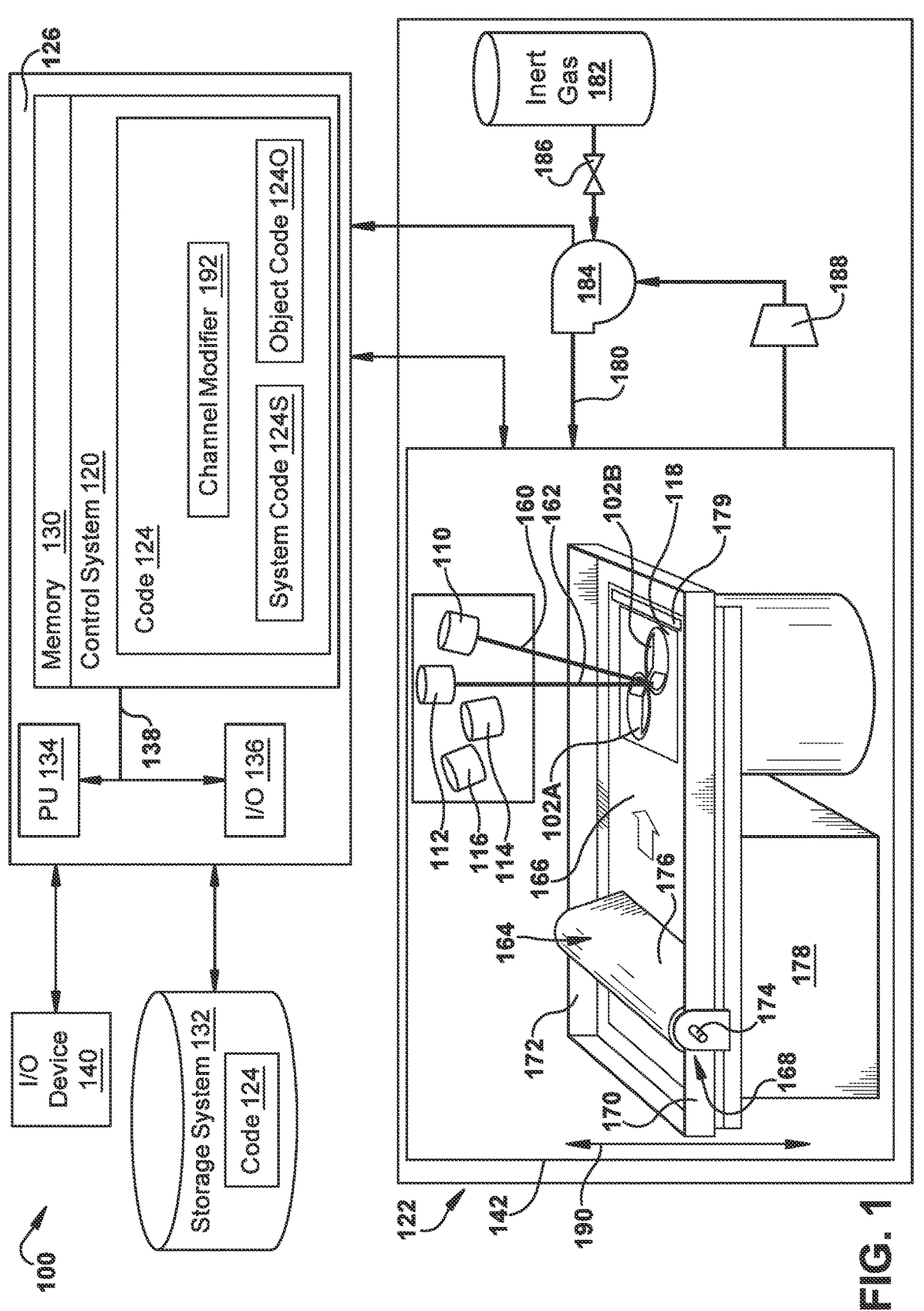
FIG. 1 shows a schematic perspective view of an illustrative conventional two melting beam additive manufacturing system building an object.

FIG. 1 shows a schematic/block view of an illustrative computerized metal powder additive manufacturing system 100 (hereinafter 'AM system 100') for generating one more components 102A, 102B, which may include parts, coupons, etc., of which only a single layer is shown. This example system 100 describes building components using multiple irradiation devices, e.g., four lasers 110, 112, 114, 116, but it is emphasized and will be readily recognized that the teachings of the disclosure are equally applicable to using any number of irradiation devices, i.e., one or more. In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and also other forms of additive manufacturing. Components 102A, 102B are illustrated as circular elements; however, it is understood that the additive manufacturing process can be readily adapted to manufacture any shaped object, a large variety of objects and a large number of objects on a build platform 118.

AM system 100 generally includes a metal powder additive manufacturing control system 120 ("control system") and an AM printer 122. As will be described, control system 120 executes object code 124O to generate components.

Control system 120 is shown implemented on computer 126 as computer program code. To this extent, computer 126 is shown including a memory 130 and/or storage system 132, a processor unit (PU) 134, an input/output (I/O) interface 136, and a bus 138. Further, computer 126 is shown in communication with an external I/O device/resource 140 and storage system 132. In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the objects in computer 126, and I/O device 140 can comprise any device that enables a user to interact with computer 126 (e.g., keyboard, pointing device, display, etc.). Computer 126 is only representative of various possible combinations of hardware and software. For example, processor unit (PU) 134 may comprise a single processing unit or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes program code 124 to generate object (s) 102. Program code 124 can include, inter alia, a set of computer-executable instructions (herein referred to as 'system code 124S') for operating AM printer 122 or other system parts, and a set of computer-executable instructions (herein referred to as 'object code 124O') defining object(s) 102 to be physically generated by AM printer 122. As described herein, additive manufacturing processes begin with a non-transitory computer readable storage medium (e.g., memory 130, storage system 132, etc.) storing program code 124. System code 124S for operating AM printer 122 may include any now known or later developed software code capable of operating AM printer 122.

Object code 124O defining components 102A, 102B may include a precisely defined 3D model of an object and can be generated from any of a large variety of well-known computer aided design (CAD) software systems such as AutoCAD®, TurboCAD®, DesignCAD 3D Max, etc. In this regard, object code 124O (also referred to herein as a "print input" or "build" file) can include any now known or later developed file format. Furthermore, object code 124O representative of components may be translated between different formats. For example, object code 124O may include Standard Tessellation Language (STL) files which was created for stereolithography CAD systems, or an additive manufacturing file (AMF), which is an international standard that is an extensible markup-language (XML) based format designed to allow any CAD software to describe the shape and composition of any three-dimensional object to be fabricated on any AM printer. Object code 124O representative of object(s) 102 may also be converted into a set of data signals and transmitted, received as a set of data signals and converted to code, stored, etc., as necessary. In any event, object code 124O may be an input to AM system 100 and may come from a part designer, an intellectual property (IP) provider, a design company, the operator or owner of AM system 100, or from other sources. In any event, control system 120 executes system code 124S and object code 124O, dividing components into a series of thin slices that assembles using AM printer 122 in successive layers of material.

AM printer 122 may include a processing chamber 142 that is sealed to provide a controlled atmosphere for component printing, e.g., a set pressure and temperature for lasers, or a vacuum for electron beam melting. A build platform 118, upon which object(s) 102 is/are built, is positioned within processing chamber 142. A number of irradiation devices 110, 112, 114, 116 are configured to melt layers of metal powder on build platform 118 to generate object(s) 102.

As shown in FIG. 1, an applicator 164 may create a thin layer of raw material 166 spread out as the blank canvas from which each successive slice of the final object will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 take a variety of forms. In one embodiment, applicator 164 may include a member 176 configured to move along opposing rails 170, 172, and an actuator element (not shown in FIG. 1) in the form of a tip, blade or brush configured to spread metal powder evenly over build platform 118, i.e., build platform 118 or a previously formed layer of object(s) 102, to create a layer of raw material. The actuator element may be coupled to member 176 using a holder (not shown) in any number of ways. The process may use different raw materials in the form of metal powder. Raw materials may be provided to applicator 164 in a number of ways. In one embodiment, shown in FIG. 1, a stock of raw material may be held in a raw material source 178 in the form of a chamber accessible by applicator 164. In other arrangements, raw material may be delivered through applicator 164, e.g., through member 176 in front of its applicator element and over build platform 118. In any event, an overflow chamber 179 may be provided on a far side of applicator 164 to capture any overflow of raw material not layered on build platform 118. In FIG. 1, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, components may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCr-FeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., Ti6Al4V), stainless steel (e.g., 316L) cobalt-chrome alloy (e.g., CoCrMo), and aluminum alloy (e.g., AlSi10Mg). In another example, the metal may include practically any reactive metal such as but not limited to those known under their brand names: Inconel 738, IN738LC, Rene 108, FSX 414, X-40, X-45, MarM 247, MAR-M509, MAR-M302, CM247 or Merl 72/Polymet 972, some of which may be classified as a gamma prime hardened superalloy.

The atmosphere within processing chamber 142 is controlled for the particular type of irradiation device being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g., a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182 and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build platform 118 may lower and/or chamber 142 and/or applicator 164 may rise after each layer. Vertical adjustment system 190 may include any now known or later developed linear actuators to provide such adjustment that are under the control of control system 120.

In operation, build platform 118 with metal powder thereon is provided within processing chamber 142, and control system 120 controls the atmosphere within processing chamber 142. Control system 120 also controls AM printer 122, and in particular, applicator 164 (e.g., linear actuator 174) and irradiation device(s) 110, 112, 114, 116 to sequentially melt layers of metal powder on build platform 118 to generate object(s) 102 according to embodiments of the disclosure. As noted, various parts of AM printer 122 may vertically move via vertical adjustment system 190 to accommodate the addition of each new layer, e.g., a build platform 118 may lower and/or chamber 142 and/or applicator 164 may rise after each layer.

Part Marking Process

Figure 2:
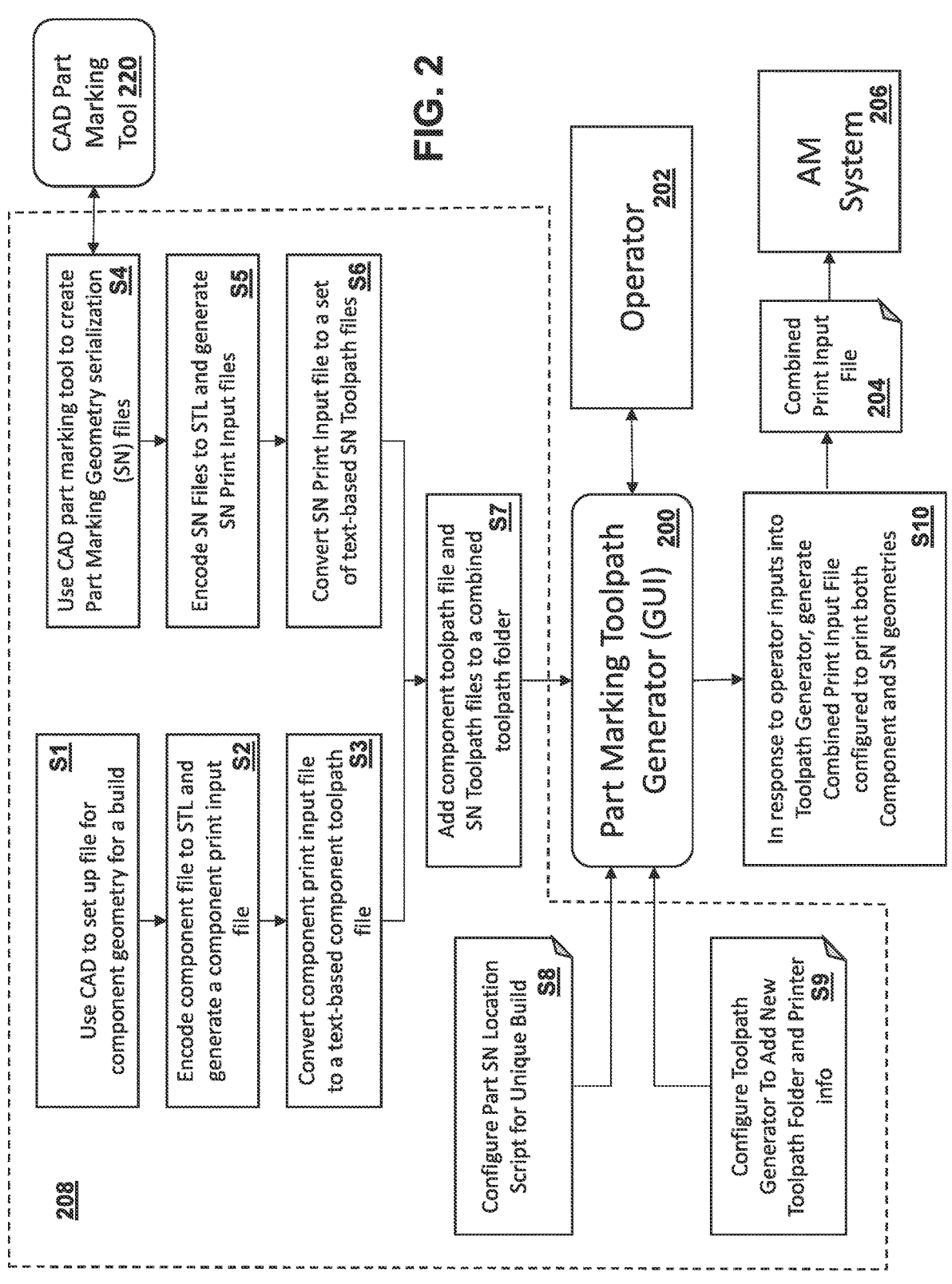
FIG. 2 shows a flow diagram of a part marking process for an additive manufacturing system, according to embodiments of the disclosure.

FIG. 2 depicts an illustrative part marking process for an AM system 206, such as that described in FIG. 1. Note that the terms "parts" and "components" are used interchangeably herein to generally describe any object being printed. Accordingly, it is understood that the term "part marking" refers to the marking of any object on a build plate. In some embodiments, part markings include serialization (SN) data, e.g., serial numbers or the like. However, it is understood that a given part marking may include any type of printed indicia that may change from part to part, e.g., identification characters such as numbers, characters, codes, etc. In some cases, the build plate includes a batch of duplicate parts, and each part may have its own unique serialization. For example, duplicate parts may each include a serial number having characters common to all of the parts and one or more characters unique to the individual parts.

In some embodiments, the process utilizes a part marking toolpath generator 200 (hereafter "toolpath generator 200") that allows an operator 202 to select a build operation that specifies, e.g., a part family, a build type, a print machine identifier, a batch number, etc., which may be encoded in serialization data for the build operation. In some cases, toolpath generator 200 includes a graphical user interface (GUI) with selectable user inputs, e.g., dropdown menus for selecting builds and build options. In response to operator inputs into toolpath generator 200, a combined print input file 204 is generated and submitted to AM system 206 for executing the build. The combined print input file 204 includes both the base (i.e., component) scan path data and part marking (i.e., serialization) scan path data.

Figure 3:
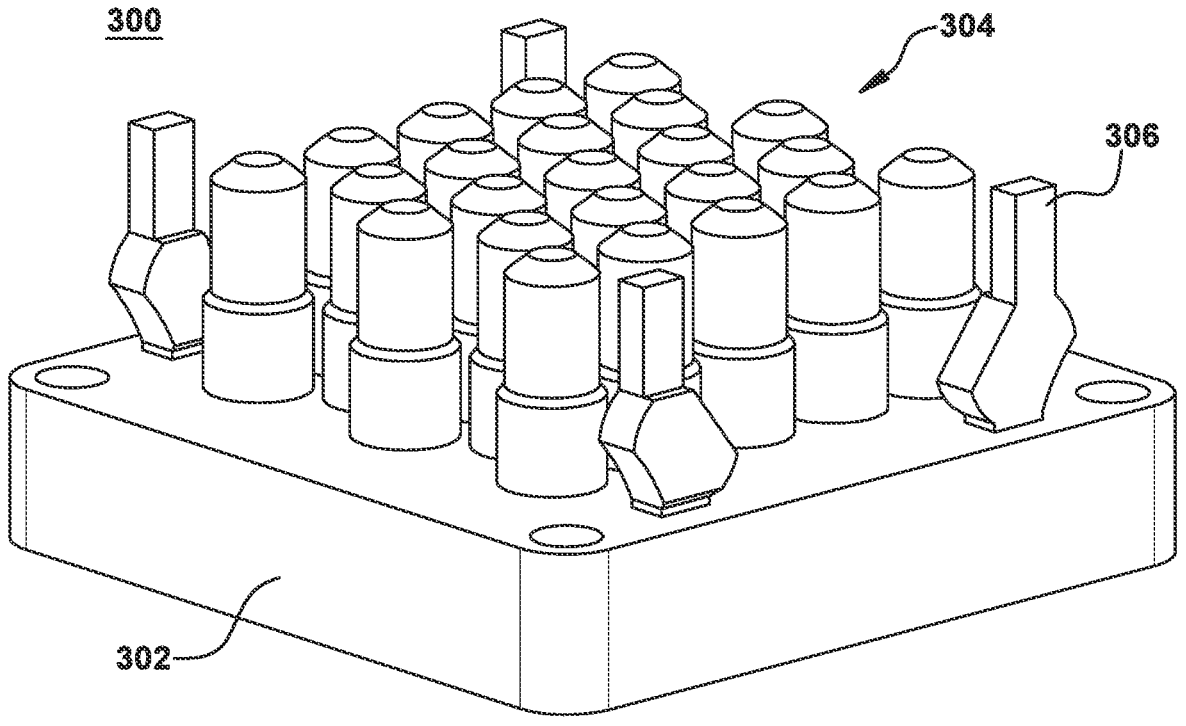
FIG. 3 shows a CAD geometry for a batch of parts, according to embodiments of the disclosure.

The process for creating the information required by toolpath generator 200 to effectuate a build operation is generally shown in box 208. The process initially involves two paths, a first path S1-S3 generates a component toolpath file that defines the geometries/scan paths of components in the build, and a second path S4-S6 creates part marking files that provide part marking geometries. Beginning at S1, a CAD tool is utilized to set up the file for the component geometry for a set of components on a build plate. An example of a CAD output 300 is shown in FIG. 3, which includes a build plate 302, a batch of duplicate parts 304 and coupons 306. Next, at S2, using known techniques, the CAD output 300 is encoded to an STL file format and from that a component print input file is generated. At S3, the component print input file is converted to a text-based toolpath file, such as a common layer interface (CLI) file. CLI is a universal format that utilizes a text-based representation of scan paths for layers of geometry in AM technologies.

Figure 4A:
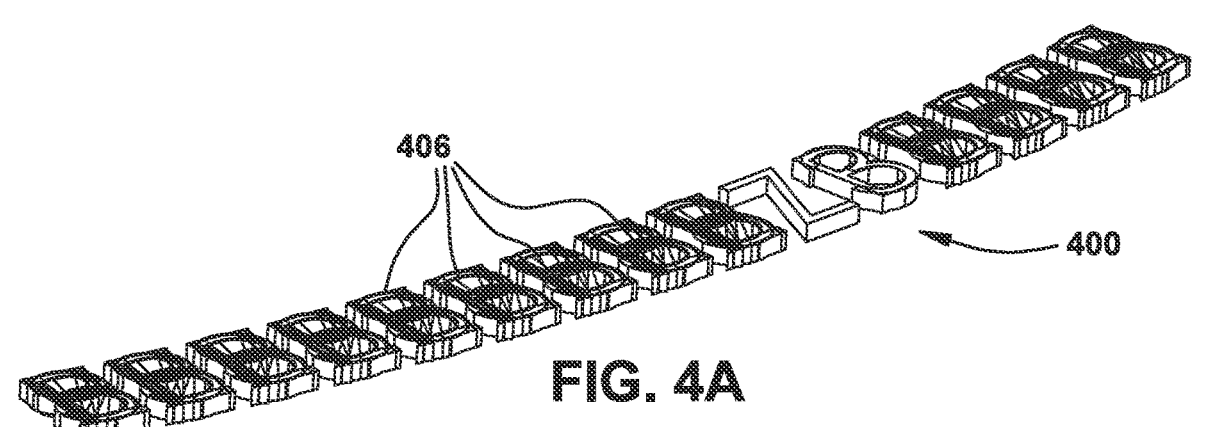
FIGS. 4A, 4B, 4C show CAD geometries for a part marking serialization, according to embodiments of the disclosure.
Figure 4B:
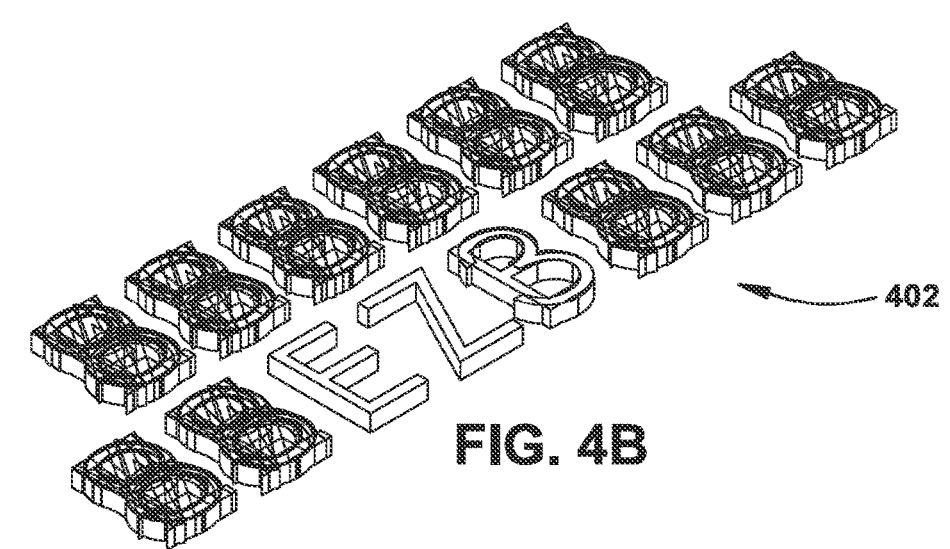
Figure 4C:
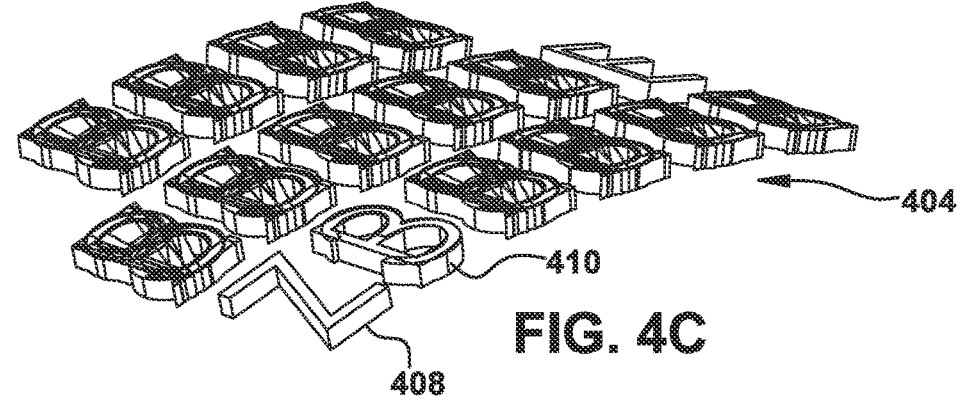

Along the second path, at S4, a CAD part marking tool 220 is utilized to create a part marking geometry. In this illustrative embodiment, the part marking geometry is stored in a set of serialization (i.e., SN) files. The CAD part marking tool 220 may for example utilize known CAD technologies to provide a parametric model that creates linked faces and generates serialization characters that follow a wide variety of faces, edges/curves, and geometries, as well as different stacking variants and scaling and sizing options. FIGS. 4A, 4B, 4C depict three examples of CAD generated part marking geometries 400, 402, 404, respectively. Each geometry is generated to conform to a shape or face of parts onto which part markings are to be applied. In these examples, each geometry includes a predefined sequence of 16 character positions 406, and each position 406 includes a set of possible character values that can fill a given character position. For example, character position 408 has only one possible character value Z, while character position 410 has two possible character values B or 3. Each position can have any number of possible character values, e.g., A-Z, 0-9, special characters, etc., which defines a set of character geometries within the part marking geometry. Thus, the part marking geometry includes a predefined sequence of character positions, and wherein each character position includes a set of character values that can be printed at a given character position. In certain embodiments, CAD data for each position/character value is stored in a unique SN file that defines the character geometry. The part marking geometry thus provides a library of part marking characters that can later be dynamically selected and combined with location data to create part marking print inputs for associated parts during a build.

At S5 (FIG. 2), each SN file is encoded to an STL format, and from that a set of SN print input files are generated. In one embodiment, the set of SN print input files are created by an export feature of the CAD part marking tool 220, which names each SN print input file with a label to identify its position and character value. The naming scheme allows later processes to easily select files corresponding to required characters.

The part marking geometry is created by the CAD part marking tool 220 by assembling the design into a base model and locating the design on an associated component. The full set of serialization characters in an SN geometry (e.g., geometry 400, FIG. 4A) created by the CAD part marking tool 220 are then exported with labels indicating a character value and position, which facilitates later action by toolpath generator 200. An export tool may be included in the CAD part marking tool 220 that exports triangulated geometry files (e.g., STL files) by the names given to them in their CAD feature tree, which is commonly used representation of features in CAD systems. For example, the SN print input file "1_A.stl" may be designated to hold the serialization character A at position 1 in the part marking geometry.

At S6, the SN print input files are converted to set of text-based SN toolpath files, such as CLI files. As noted, CLI is a text-based representation of scan paths for layers of geometry. Next, at S7, both the component toolpath file and SN toolpath files are stored in a combined toolpath folder, e.g., at a specified location on a file server. An advantage of using a text-based format for both the component and part marking geometries is that they can be easily edited and manipulated, e.g., sections can be added, edited, removed, etc., by the toolpath generator 200. Note that S1-S7 only needs to be done one time to create a given build.

In this embodiment, part marking toolpath generator 200 utilizes a part SN location script for each unique build, which is configured at S8. The part SN location script will, for example, define the number of parts in the component toolpath file, the location of the part marking geometry on each part, the location of the toolpath files, character values to be applied to each component, e.g., to create unique serial numbers, which laser to use, etc. Thus, for example, each part marking on a build plate is assigned a specified location, as defined by the part SN location script. In some cases, each part marking may be translated, i.e., located relative to some point in 3D space, e.g., "part 5: (26, 42, 0, 45)" where 26, 42 and 0 are millimeters in the x, y, and z directions, and 45 is the angular rotation of the character from a predetermined reference position. The part SN location script will also determine part marking details, namely, which characters should be printed for each part, e.g., ABC1XYZ for part 1, ABC2XYZ for part 2, etc. Additionally, the part SN location script can also specify the location/names of the component and SN toolpath files in the combined toolpath folder. This translation ability allows the part marking geometry output of the CAD part marking tool 220 to be dynamically patterned to uniquely mark each of the duplicate parts on the build plate. As such, part markings do not need to be created and set up for individual locations for each duplicate part. Rather, SN toolpath files are utilized as needed to create part markings for a given component type (regardless of how many part duplicates are on a build plate), which may have unique geometry, size, and location requirements.

At S10, in response to operator inputs into toolpath generator 200, a combined print input file 204 is generated to print both component and SN geometries. As part of this, toolpath generator 200 processes the SN toolpath files (which, e.g., provides character geometries) and part SN location script (which, e.g., specifies location information, serialization information, laser information, etc.) to generate a modified set of SN toolpath files that provides finished scan path data for each part marking in the build. The text-based SN and component toolpath files are combined and then converted to a print input file format suitable for SLM, or other desired print file formats, which can be used to print components with part markings. As is evident, once the combined toolpath folder and part SN location script are established for each build, an operator 202 can simply interface with toolpath generator 200 to select and create the print input files, reducing processing time and allowing for the foolproof generation of print input files across previously set up builds.

In one embodiment, to generate the combined print input file 204, toolpath generator 200 utilizes the geometry details in associated SN toolpath files for each required character position/character value for each part marking. For example, for a part marking "ABC1XYZ," the SN toolpath files for character position 1, character value "A"; character position 2, character value "B"; and so on, are processed to generate a modified toolpath file that combines the geometry from the selected SN toolpath files and the location and character value information from the part SN location script. This process is repeated for each part marking in the build.

As is evident, this approach provides significant flexibility in marking parts. For example, if a new build requires the part marking location on each part to be slightly adjusted, e.g., in the z direction of the xyz space, the part SN location script can simply be edited to create the adjustment. Similarly, if different character values are required for a new build using the same component and SN geometries, the part SN location script could simply be edited. In various embodiments, the part SN location script can be implemented in a programming language such as Python, which can simply be edited and saved by an administrator for unique builds.

Additionally, as shown at S9, toolpath generator 200 may require configuration to, e.g., add a new build, specify a location of the combined toolpath folder, specify locations of part SN location scripts, add machine details, etc. In some embodiments, toolpath generator 200 is implemented in a programming language (e.g., Python), and can simply be edited by an administrator. In other embodiments, toolpath generator 200 may include an administrative interface for allowing an administrator to make modifications, e.g., adding new build configurations.

Figure 5:
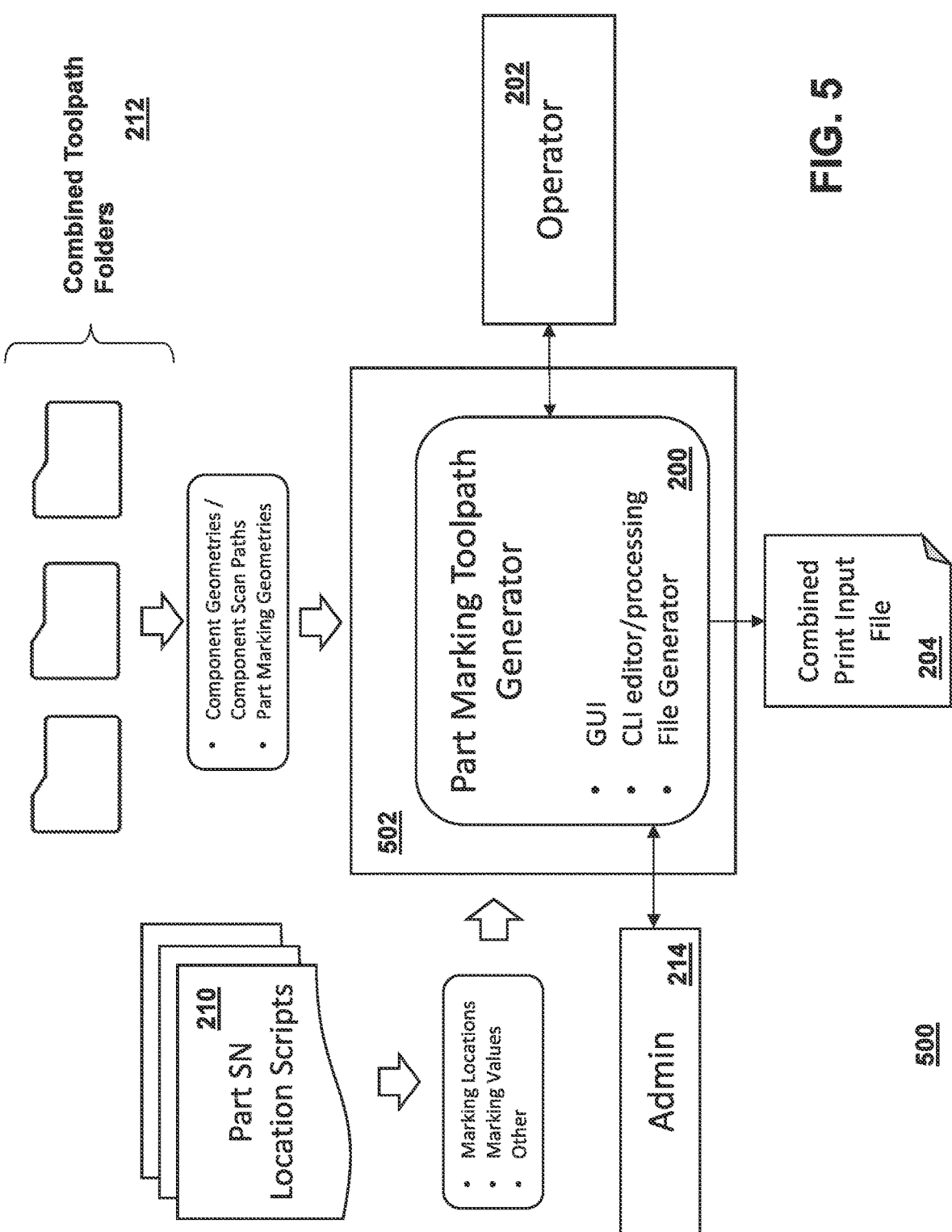
FIG. 5 shows a schematic view of a part marking system, according to embodiments of the disclosure.

FIG. 5 depicts an illustrative part marking system 500 that details a further implementation of the process described in FIG. 2. As shown, the system 500 includes a set of combined toolpath folders 212 (i.e., one for each build with unique component/part marking geometries) and a set of part SN location scripts 210 (i.e., for each different build). The operator 202 interfaces with toolpath generator 200 via a GUI to select a build, e.g., using dropdown menus, etc. In response to operator inputs, toolpath generator 200 selects the appropriate combined toolpath folder 212 and script 210, processes the component and SN toolpath files in toolpath folder 212 to generate combined text-based toolpath files, creating part marking geometries with specific part marking locations, serialization data, lasers, etc. The resulting combined toolpath files are then converted to a combined print input file 204. The system 500 may allow for an administrator 214 to add new build options to the toolpath generator 200, e.g., via an administrator interface. Part marking toolpath generator 200 may be implemented within any type of computing system 502. For example, computing system 502 may be implemented using a similar computer system as that described with reference to computing system 126 in FIG. 1.

Figure 6:
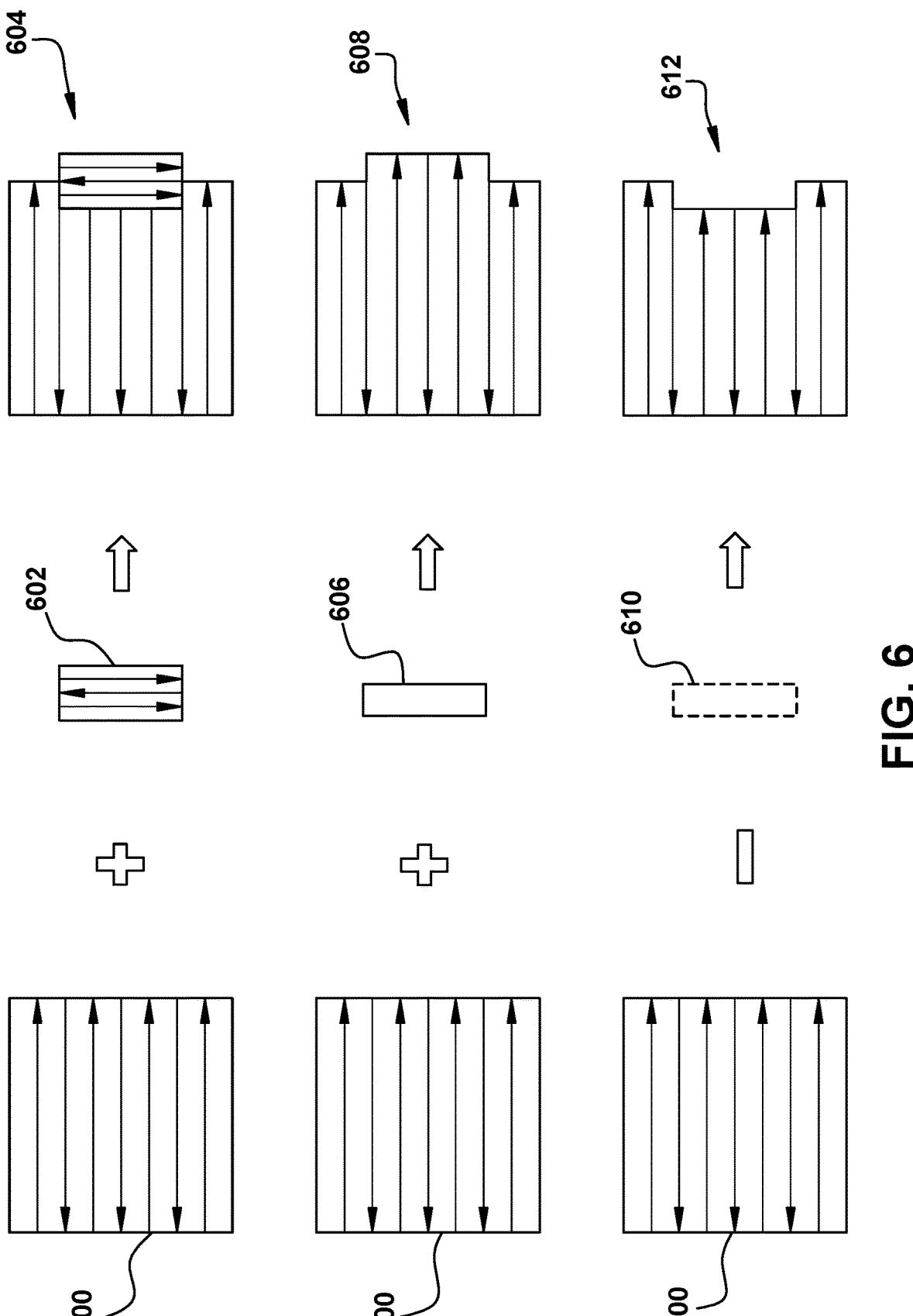
FIG. 6 shows various approaches for generating a combined print input file, according to embodiments of the disclosure.

FIG. 6 depicts three illustrative approaches for generating a combined print input file (in which files are depicted as visual representations). Each approach includes a component toolpath file 600 with scan paths represented by arrows that form a layer of the component. In the top approach, the component toolpath file 600 and SN toolpath file 602 are included in a combined print input file 604 in which the component and SN are printed as separate layers, i.e., the combined print input file 604 includes both component scan paths and SN scan paths and component scan paths are undisturbed by the SN scan paths in the combined print input file 604. In the middle approach, the component toolpath file 600 and SN toolpath file 606 are merged into a combined print input file 608 such that component and SN are printed with a common scan path, i.e., the component toolpath file 600 is modified to extend its boundary. In the bottom approach, the SN toolpath file 610 is removed from the component toolpath file 600 in the combined print input file 612 to achieve an etched boundary with the revised scan path.

The processes and systems described herein have the technical effect of providing better part geometry when part markings (e.g., serial numbers) are applied to parts in an AM process. In particular, the scan path for the part geometry is consistent build to build and part markings are better defined. Namely, the component scan path is undisturbed by the SN scan path in the combined print input file. Furthermore, the process allows for greater flexibility and speed in specifying and changing part marking locations, values, build types, etc. For example, this approach easily allows for creating variations to a build (i.e., different build types), and thus allows the operator to choose a different layout of parts or coupons, e.g., a build type might add a coupon with its associated serialization, another build type might have one less component part on the plate, etc.

It should be noted that in some alternative implementations, the acts noted may occur out of the order described or, for example, may in fact be executed substantially concurrently or in the reverse order, depending upon the act involved.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for marking parts in an additive manufacturing (AM) process, comprising:

converting an encoded component file for a plurality of components to a text-based component toolpath file;

creating and encoding a set of serialization (SN) files for characters in a part marking geometry, wherein the part marking geometry is configured to be applied to each of the plurality of components and includes a predefined sequence of character positions and possible character values for each position;

converting encoded SN files to a set of text-based SN toolpath files; and generating a combined print input file from the component toolpath file and the SN toolpath files to include both component scan paths and SN scan paths, wherein the generating includes combining location and part marking details from a part SN location script with SN geometries from the SN toolpath files to create modified SN toolpath files for marking each of the plurality of components with a unique set of characters;

wherein the part SN location script further defines how many components are on a build plate and a file server location of the component toolpath file and the SN toolpath files.

2. The method of claim 1, wherein the encoded component file and encoded set of SN files are encoded in a stereolithography (STL) file format.

3. The method of claim 1, wherein the text-based component toolpath file and the text-based SN toolpath files include common layer interface (CLI) files.

4. The method of claim 1, wherein the plurality of components comprises a plurality of duplicate components.

5. The method of claim 1, wherein the combined print input file is generated in response to inputs into a user interface, wherein the inputs include a print machine identifier, a batch number and a build type.

6. The method of claim 5, wherein the user interface includes a graphical user interface (GUI) with selectable user inputs.

7. The method of claim 1, wherein the component scan path is undisturbed by the SN scan path in the combined print input file.

8. The method of claim 1, wherein the set of SN files are created with a computer aided design (CAD) SN tool and wherein the encoded SN files are named with labels indicating a character value and a character position of an associated serialized character.

9. The method of claim 1, further comprising inputting the combined print input file into an additive manufacturing printer and printing components with part markings using selective laser melting (SLM).

10. A computing system, comprising:

a memory; and a processor coupled to the memory and configured to generate part markings in an additive manufacturing (AM) process, according to process that comprises:

receiving inputs that select an AM build for a batch of components;

in response to a selected AM build:

determining a combined toolpath folder associated with the AM build, wherein the combined toolpath folder includes serialization (SN) toolpath files representing a part marking geometry and a component toolpath file representing component geometries; and generating a combined toolpath file that includes scan path data for both the batch of components and part markings, wherein the scan path data for the part markings is determined according to a part SN location script that locates character geom-etries and assigns character values for each component such that each component in the AM build receives a unique set of characters;

wherein the part SN location script further defines how many serialized components are on a build plate and a file server location of the component toolpath file and the SN toolpath files.

11. The system of claim 10, further comprising converting the combined toolpath file to a combined print input file and implementing an AM build.

12. The system of claim 11, wherein the SN toolpath files and the component toolpath file are stored in a text-based format.

13. The system of claim 12, wherein the text-based format comprises common layer interface (CLI) files.

14. The system of claim 10, wherein the part marking geometries includes a predefined sequence of character positions, and wherein each character position includes a set of character values that can be printed at a given character position.

15. The system of claim 11, wherein the combined print input file is generated in response to inputs into a user interface from an operator, wherein the inputs include a print machine identifier, a batch number and a build type.

16. The system of claim 15, wherein the user interface includes a graphical user interface (GUI) with selectable user inputs.

17. The system of claim 11, wherein the scan path data for the batch of components is undisturbed by the scan path data for the part markings in the combined print input file.

18. The system of claim 10, wherein the part marking geometry is created with a computer aided design (CAD) SN tool.

* * * * *